United States Patent [19]

Shirosaki et al.

[11] Patent Number: 5,751,297
[45] Date of Patent: May 12, 1998

[54] CONTROL METHOD FOR PAPER-DRIVEN TYPE AUTOMATIC DRAFTING MACHINE

[75] Inventors: Akimitsu Shirosaki; Matsushima Toshiaki, both of Tokyo, Japan

[73] Assignee: Mutoh Industries Ltd., Tokyo, Japan

[21] Appl. No.: 580,284

[22] Filed: Sep. 11, 1990

[30] Foreign Application Priority Data

Sep. 27, 1989 [JP] Japan ............................ 1-251565
Feb. 6, 1990 [JP] Japan ............................ 2-26774

[51] Int. Cl.⁶ ............................ G01D 15/24; G01D 9/00
[52] U.S. Cl. ............................ 346/136; 346/17; 346/25
[58] Field of Search .............................. 346/136, 25, 17;
347/102, 16; 242/324, 333, 333.1; 101/424.1;
33/18.1, 18.2

[56] References Cited

U.S. PATENT DOCUMENTS

| | | | |
|---|---|---|---|
| 4,172,565 | 10/1979 | Zaffarano | 346/136 X |
| 4,469,026 | 9/1984 | Irwin | 347/102 X |
| 4,527,885 | 7/1985 | Ayata et al. | 347/3 X |
| 4,566,014 | 1/1986 | Paranjpe et al. | 346/25 |
| 4,630,071 | 12/1986 | Nakazawa | 346/136 |
| 4,728,963 | 3/1988 | Rasmussen et al. | 346/25 |
| 4,764,880 | 8/1988 | Pearl | 346/33 R |
| 4,823,147 | 4/1989 | Charroppin | 346/136 |
| 4,847,635 | 7/1989 | Jackson et al. | 346/136 |
| 4,933,876 | 6/1990 | Markoff et al. | 395/104 |
| 5,021,805 | 6/1991 | Imaizumi et al. | 346/25 X |

FOREIGN PATENT DOCUMENTS

| | | |
|---|---|---|
| 22 61 251 | 4/1978 | Germany . |
| 27 16 705 | 10/1978 | Germany . |
| 32 17 535 | 11/1983 | Germany . |
| 34 39 847 | 5/1985 | Germany . |
| 61-16860 | 1/1986 | Japan ............ 347/5 |

*Primary Examiner*—David F. Yockey
*Attorney, Agent, or Firm*—Wenderoth, Lind & Ponack

[57] ABSTRACT

A control method for a paper-driven type automatic drafting machine carries out a predetermined drafting operation by use of ink writing instruments. The automatic drafting machine has on its machine frame an ink dry time setter. The machine is made to wait or halt for a set time after an ink drawing completion, during which time a roll paper for the drafting machine is not rolled-up. The remaining portion of the set ink drying time for the drafting machine is displayed, so the operator can use the waiting time effectively.

6 Claims, 4 Drawing Sheets

CONTROL METHOD FOR PAPER-DRIVEN TYPE AUTOMATIC DRAFTING MACHINE

FIELD OF THE INVENTION

The present invention relates to an ink drying control method used in a paper-driven type automatic drafting machine.

PRIOR ART

Present paper-driven type automatic drafting machines are not provided with a control function to prevent the roll paper from being rolled up and causing the machine to wait, before performing its next step, until the ink drawn on the paper dries out after an ink drawing is carried out on the roll paper.

With such drafting machines failing to have a controller for setting the ink drying time, it is necessary to provide a host computer functioning to set a waiting time for drying the ink on the paper or to make an existing host computer function to set the waiting time. The host computer disadvantageously cannot transfer drafting data to the controller of the drafting machine during the waiting time.

SUMMARY OF THE INVENTION

It is the purpose of the present invention to provide a paper-driven type automatic drafting machine without the disadvantage noted above.

Thus, according to the present invention, a control method is provided for controlling a paper-driven type automatic drafting machine. According to the inventive method, the drafting machine is controlled so that, after one frame of drafting is performed, the paper will not be moved until a predetermined waiting period has elapsed. The time remaining in the waiting period is displayed for viewing by the operator.

DESCRIPTION OF THE PREFERRED EMBODIMENTS

Figure 1:
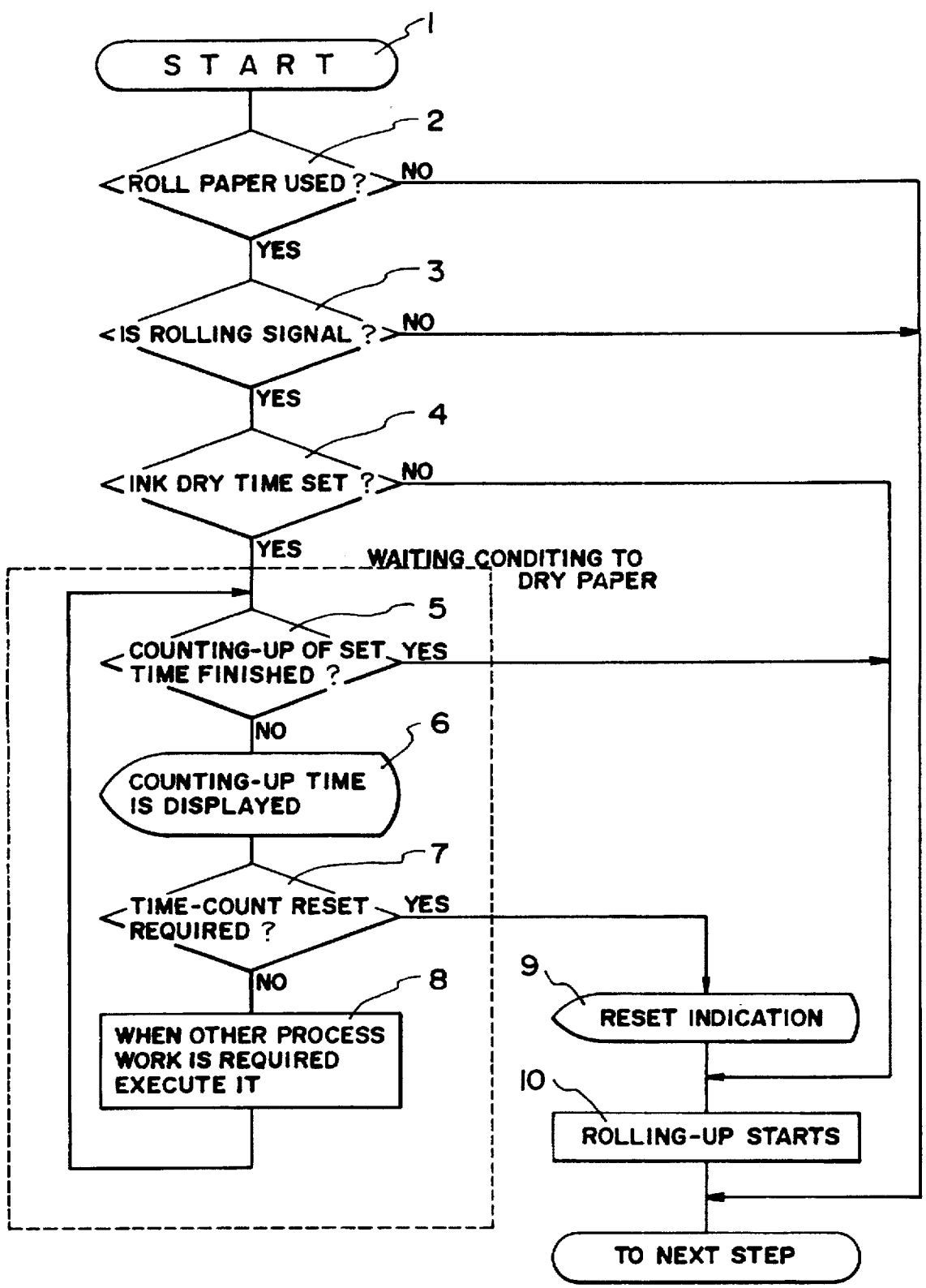
FIG. 1 is a flow chart for setting an ink drying time.

The construction of the automatic drafting machine concerning the present invention will be explained with the reference to the embodiments shown in the drawings.

Figure 4:
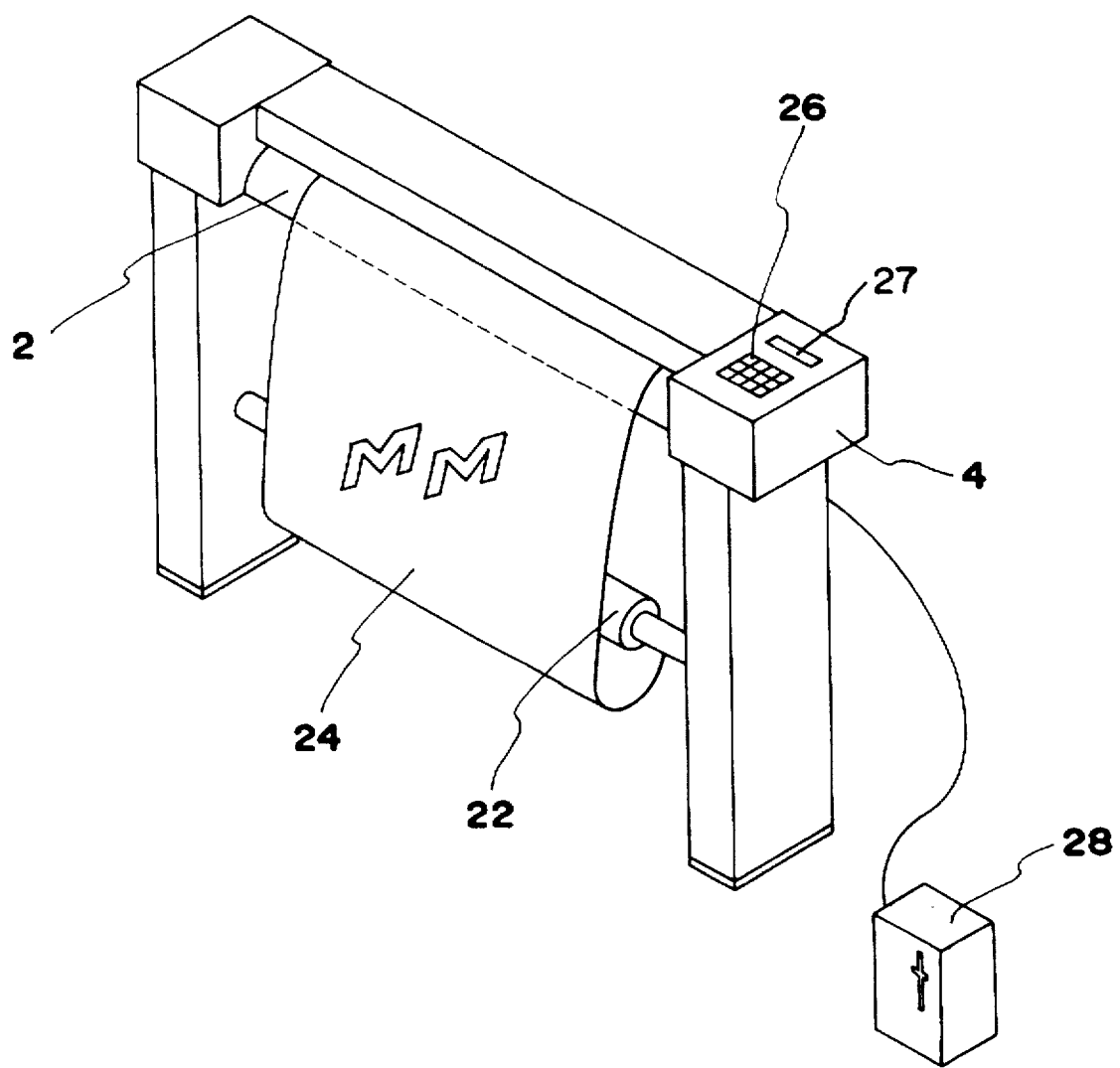
FIG. 4 shows a diagrammatic perspective view of the paper-driven type automatic drafting machine.
Figure 5:
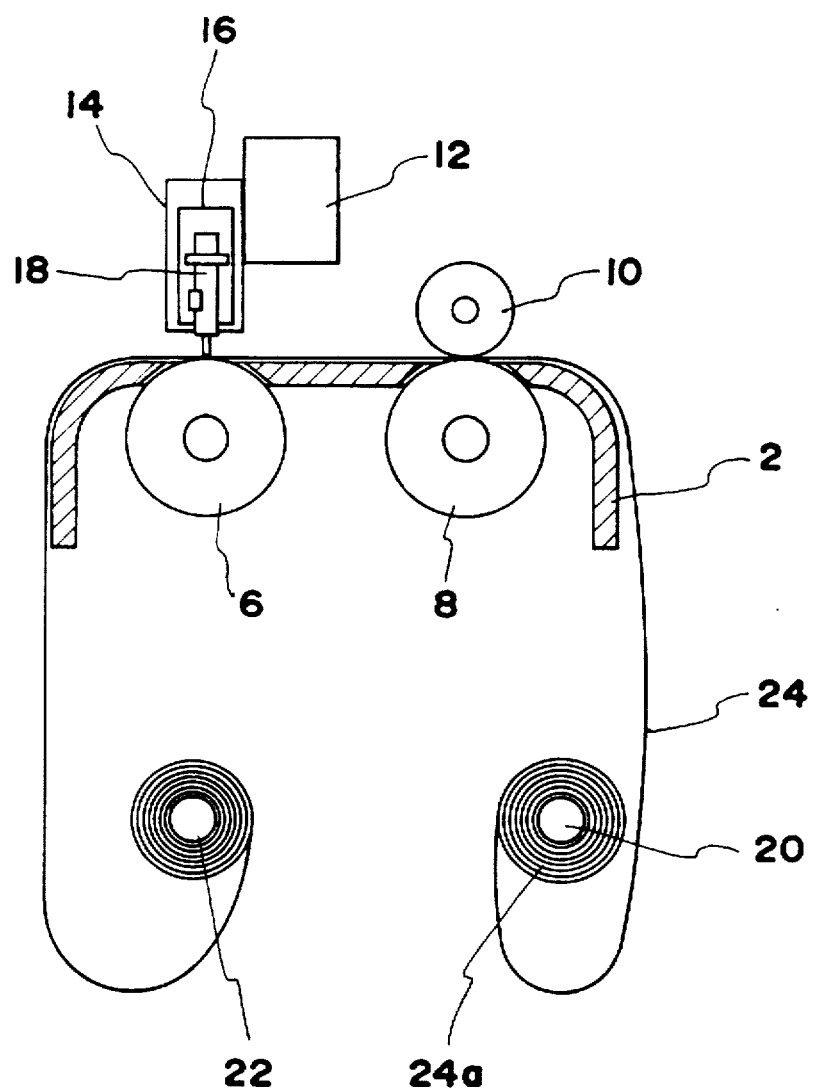
FIG. 5 depicts an explanatory side elevation of the paper-driven type automatic drafting machine.

A platen 2 shown in FIGS. 4 and 5 and secured to the machine frame 4 of the paper-driven type automatic drafting machine has grooves formed in parallel along a width direction of the platen 4. As shown in particular in FIG. 5, a drawing (or drafting) roller 6 is rotatably placed in one of the grooves and a driving roller 8 is similarly situated in another groove. These rollers 6 and 8 are rotatably supported by brackets fixed to the machine frame 4 so as to be rotated cooperatively along the same direction at substantially the same peripheral speed by means of an X motor (i.e. a motor to effect movement in an X direction). A presser roller 10 presses against the drive roller 8 by means of a force of a spring. As shown in FIG. 5, a Y rail 12 is secured to the machine frame 4 so as to extend between both ends of the frame 4, and a pen head 14 is provided so as to move along the Y rail 12 in a Y direction. A pen holder 16 cooperates with an elevating mechanism placed within the pen head 14 removably holds a writing instrument 18 such as an ink pen. The pen head 14 is controlled in its motion along the Y rail 12. The machine frame 4 has a paper supply shaft 20 and a paper roll-up shaft 22, respectively arranged so as to rotate in cooperation with a Y motor. A rolled portion 24a of paper 24 is removably supported on the paper supply shaft 20. A paid-out portion of the paper 24 rolled out of the rolled portion 24a is adapted to extend over the platen 2 and be rolled up on the paper roll-up shaft 22. The machine frame 4 contains a controller comprising a computer and the controller controls the X and Y motors and the motor for driving the elevating mechanism of the pen head 14, as well as the paper supply shaft 20, and the paper roll-up shaft 22.

The machine frame 4 has an operation panel 26 functionally connected to the controller, and the operation panel 26 has an indication portion 27 and an ink dry time set key (not shown). A host computer 28 shown in FIG. 4 supplies drafting data and various drafting commands to the controller. The machine frame 4 has a conventional rotary-type writing instrument stocker (not shown) for holding various writing instruments of plural ink pens. Any one of the plural pen holders in the stocker can be automatically exchanged mutually with the pen holder 16 on the pen head 14. The mechanism for automatically exchanging the writing instrument is well known, and such mechanism does not constitute an inventive feature of the present invention, and thus no drawing and no explanation of the mechanism is provided in the present specification.

Operation of the embodiments according to the present invention will be explained in detail with reference to FIGS. 1 and 2.

Figure 2:
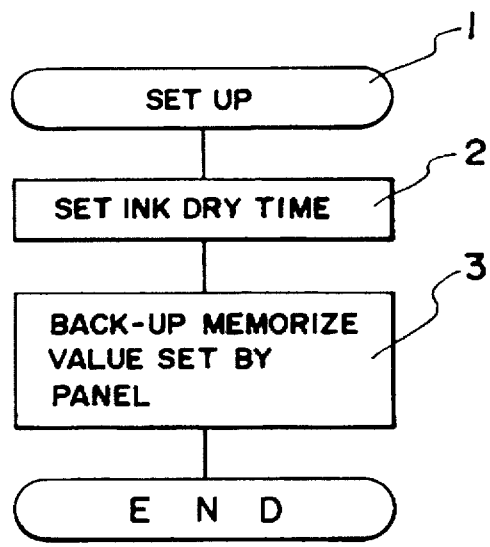
FIG. 2 is a similar flow chart.

First, the set-up program for setting an ink dry time starts from Step 1 shown in FIG. 2. The operator manipulates an ink dry time setting key of the operation panel 26 in order to set an ink dry time at Step 2 according to the kind of ink of the writing instrument held in the pen head 14. Next, the controller memorizes a set value of the ink dry time and stores it in a back-up memory and the set-up program is completed. In order to carry out a drafting operation, first the paid-out portion of the roll paper 24 is placed on the platen 2, the paid-out portion is inserted between the drive roller 8 and the pressure roller 10, and the roll paper 24 is held by both the rollers 8 and 10. After the paid-out portion of the roll paper 24 is set on the platen 2, a drafting operation of the automatic drafting machine starts. Then the controller of the machine reversibly controls motions of the drive roller 8 and the drafting roller 6, a motion of the pen head 14 along the Y rail 12, and the elevations of the writing instrument 18. As a result, the paid-out portion of the roll paper 24 on the platen 2 is moved in forward and rearward directions of the machine frame 4 and the pen head 14 is moved along directions perpendicular to the moving direction of the paid-out portion of the roller paper 24, so as to draft a picture or drawing of one predetermined frame on the paid-out portion of the roll paper 24 on the platen 2. After completion of the drawing of the one frame, the controller starts its operation for the ink dry treatment or processing program from Step 1 shown in FIG. 1 so as to begin a counting procedure of a counter for measuring an ink dry setting time. The controller judges at Step 2 whether or not the roller paper has been used in the drawing or drafting. When a yes is judged, the controller judges at Step 3 whether the host computer commands a signal for rolling-up roll paper. When a yes is judged, the controller at Step 4 judges whether there is a setting of ink dry time. When the controller judges yes, it judges at Step 5 whether a counting-up of set time for ink drying is finished. When a no is judged, the controller at Step 6 indicates a remainder time of the ink dry time on an indicator 27. It is possible to simply indicate or display the remainder time or the time elapsed from a completion of one frame drafting together with the remainder time. In this case, it is possible to know the remainder time by subtracting the time elapsed from the set time.

Next, the controller at Step 7 judges whether a time count reset command is input through the panel key 26. When a no is judged and there is demand to do another procedure, it is executed at Step 8 and it returns to Step 5. When a yes is judged at Step 7, the controller resets the display of the remainder time for ink dry setting time on the display 27 at Step 9.

Then the controller drives a motor for driving or rotating the paper supply shaft 20 and the paper roll-up shaft 22 at Step 10 in order to roll-up a frame portion of the roll paper 24 on the roll-up shaft 22, thereby finishing a roll paper roll-up procedure. Next, the controller transfers the drafting machine to the next drawing to be executed on the next frame. When the roll paper 24 is rolled up on the roll-up shaft 22 as shown in FIG. 5, some length portion of the roll paper 24 depends from the shafts 20 and 22 in order to allow the paid-out portion of the roll paper 24 to be easily moved in the forward and rearward directions in a drafting operation and to prevent the roll paper 24 from being tensioned due to the motion of the paid-out portion. When a no is judged at Steps 2 and 3 of FIG. 1, it is transferred to the next step. When a no is judged at Step 3, it is transferred to Step 10. When a yes is judged at Step 5, it is transferred to Step 10.

Next, another embodiment of the ink dry processing program will be explained with reference to the flow chart of FIG. 3.

Figure 3:
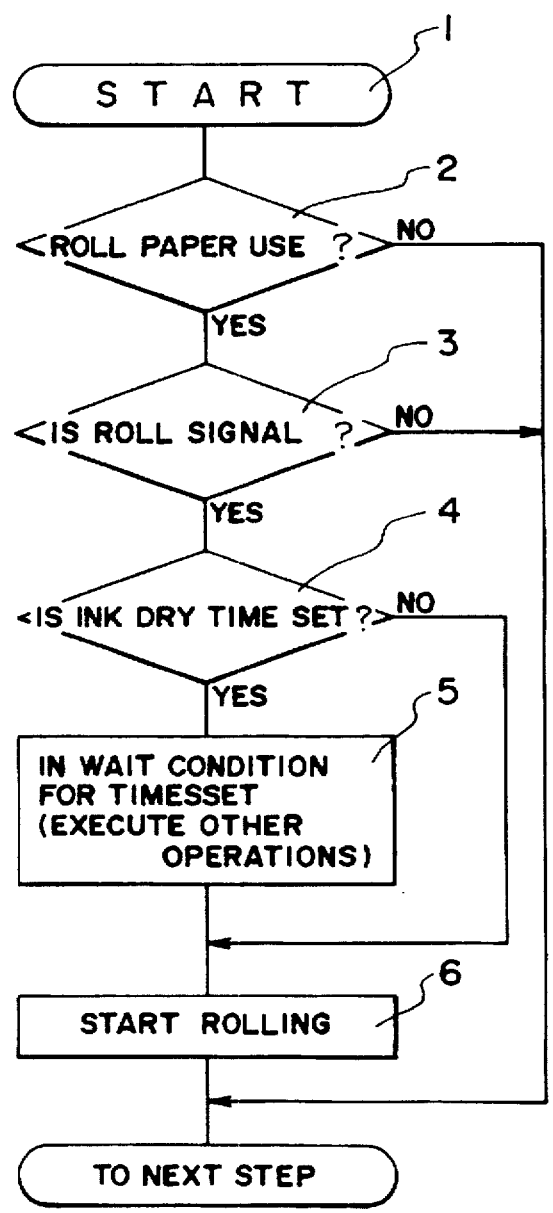
FIG. 3 is another flow chart of another embodiment of the present invention.

The controller starts the ink dry processing program from Step 1 of FIG. 3. At Step 2, the controller judges whether the drafting process has used the roll paper. When it judges yes, the controller judges at Step 3 whether the command from the host computer contains a signal for rolling-up the roll paper. When the controller judges yes, the controller judges at Step 4 whether there is a setting of ink dry time. When the controller judges yes, the automatic drafting machine at Step 5 is placed in a waiting status for a set time. During the time set for waiting, other processing is executed. When the ink dry time set is elapsed, the controller drives the motor for rotating both the shafts 20 and 22 to rotate the paper supply shaft 20 and the paper roll-up shaft 22 in order to roll-up one frame portion of the roll paper 24 on the roll-up shaft 22, thereby finishing the roll paper roll-up process at Step 6. Next, the controller transfers to a process of drafting the next frame. According to the embodiment of the present invention, the remainder time of the waiting time for ink drying is not displayed.

As described above, it is possible to freely set the dry time according to the kind of the ink writing instrument used at the operator—s option. The waiting time for drying the drawing drawn by ink is adapted to be set at the side of the controller of the machine, so it is possible to convert data from the host computer to the controller in the waiting time. Consequently, it is possible to shorten the whole drawing processing time, in particular, in the case of continuous drafting. Seeing the remainder time of the ink dry waiting time, the operator knows the length of the waiting time remaining. Consequently, it is possible to carry out some operations, such as maintenance and supplementation of the writing instrument, etc. of the operator and to effectively use the waiting time.

We claim:

1. A control method for controlling a paper-driven automatic drafting machine capable of performing an ink drafting operation and having a frame, an elongated platen mounted to the frame, a paper supply for supplying paper from a roll, a paper winder for rolling-up the paper, a drive roller for driving the paper along the platen in forward and rearward directions, and a pen head for holding an ink writing instrument and moving the writing instrument relative to the paper in directions perpendicular to the forward and rearward directions, said method comprising the steps of:

setting an ink drying time period;

operating the automatic drafting machine to perform the ink drafting operation;

after performance of the ink drafting operation, avoiding rolling-up of the paper by stopping operation of the paper winder during the ink drying time period; and after expiration of the ink drying time period, allowing the paper to be rolled-up by the paper winder.

2. A control method as recited in claim 1, further comprising the step of displaying an amount of time remaining in the ink drying time period.

3. A control method as recited in claim 1, wherein said step of setting the ink drying time period comprises manipulation of an ink dry time setting key by an operator.

4. A control method for controlling a paper-driven automatic drafting machine capable of performing an ink drafting operation and having a frame, an elongated platen mounted to the frame, a paper supply for supplying paper from a roll, a paper winder for rolling-up the paper, a drive roller for driving the paper along the platen in forward and rearward directions, and a pen head for holding an ink writing instrument and moving the writing instrument relative to the paper in directions perpendicular to the forward and rearward directions, said method comprising the steps of:

setting an ink drying time period;

operating the automatic drafting machine to carry out the ink drafting operation;

determining whether the ink drafting operation has yet been carried out;

if the ink drafting operation has been carried out, determining whether the ink drying time period has elapsed since completion of the ink drafting operation;

if the ink drying time period has not elapsed since completion of the ink drafting operation, avoiding rolling-up of the paper by stopping operation of the paper winder; and if the ink drying time period has elapsed since completion of the ink drafting operation, allowing the paper to be rolled-up by the paper winder.

5. A control method as recited in claim 4, further comprising the step of displaying an amount of time remaining in the ink drying time period.

6. A control method as recited in claim 4, wherein said step of setting the ink drying time period comprises manipulation of an ink dry time setting key by an operator.

* * * * *